United States Patent
Fahldieck

(10) Patent No.: US 9,376,307 B2
(45) Date of Patent: Jun. 28, 2016

(54) VALVE FOR LIQUIDS

(75) Inventor: Andreas Fahldieck, Idar-Oberstein (DE)

(73) Assignee: KHS GmbH, Dortmund (DE)

( * ) Notice: Subject to any disclaimer, the term of this patent is extended or adjusted under 35 U.S.C. 154(b) by 243 days.

(21) Appl. No.: 14/112,093

(22) PCT Filed: Apr. 14, 2012

(86) PCT No.: PCT/EP2012/001623
§ 371 (c)(1),
(2), (4) Date: Jan. 7, 2014

(87) PCT Pub. No.: WO2012/143108
PCT Pub. Date: Oct. 26, 2012

(65) Prior Publication Data
US 2014/0124095 A1 May 8, 2014

(30) Foreign Application Priority Data

Apr. 21, 2011 (DE) .............................. 102011018479

(51) Int. Cl.
*B67C 3/28* (2006.01)
*B67D 7/36* (2010.01)
*B67C 3/26* (2006.01)
*F16K 23/00* (2006.01)
*F16K 31/08* (2006.01)
*F16K 41/10* (2006.01)

(52) U.S. Cl.
CPC ................ *B67D 7/36* (2013.01); *B67C 3/2608* (2013.01); *B67C 3/28* (2013.01); *F16K 23/00* (2013.01); *F16K 31/086* (2013.01); *F16K 41/10* (2013.01)

(58) Field of Classification Search
CPC ................................. B67C 3/2637; B67C 3/28
USPC .................................................. 141/146, 392
See application file for complete search history.

(56) References Cited

U.S. PATENT DOCUMENTS

| 3,073,358 A * | 1/1963 | Burt Robert V ................. 141/59 |
| 3,880,206 A * | 4/1975 | Johnston ........................... 141/5 |
| 4,344,469 A * | 8/1982 | Brown ............................ 141/90 |
| 4,386,635 A * | 6/1983 | Ahlers et al. ...................... 141/6 |
| 4,506,709 A * | 3/1985 | Dennhardt ....................... 141/95 |
| 7,650,916 B2 * | 1/2010 | Clusserath ....................... 141/95 |
| 8,517,065 B2 * | 8/2013 | Conforti ......................... 141/146 |
| 2002/0017324 A1 | 2/2002 | Hisamura et al. |
| 2011/0005637 A1 * | 1/2011 | Meinzinger .................... 141/104 |

(Continued)

FOREIGN PATENT DOCUMENTS

| CH | 678754 | 10/1991 |
| DE | 11 56 616 | 10/1963 |
| DE | 2207580 | 8/1973 |

(Continued)

OTHER PUBLICATIONS

Machine translation of FR2576079, Jul. 18, 1986, all pages.*

*Primary Examiner* — Nicolas A Arnett
(74) *Attorney, Agent, or Firm* — Occhiuti & Rohlicek LLP

(57) ABSTRACT

An apparatus for distributing a filling product includes a filling valve for liquids, a closure element, and an actuator. The filling valve is configured for opening and closing a distribution or flow opening by linearly displacing the closure element. The valve comprises a valve chamber in which the closure element is arranged. The actuator, which is arranged within a constant volume arranged within the valve chamber, influences movement of the closure element.

20 Claims, 3 Drawing Sheets

(56) References Cited

U.S. PATENT DOCUMENTS

2013/0105041 A1* 5/2013 Krulitsch et al. .................. 141/4
2014/0027015 A1* 1/2014 Fahldieck et al. ............. 141/329

FOREIGN PATENT DOCUMENTS

| DE | 2457019 | 9/1976 |
| DE | 3446214 | 6/1986 |
| DE | 3643318 | 6/1988 |
| DE | 4039766 | 6/1992 |
| DE | 69025466 | 10/1996 |
| DE | 60006002 | 8/2004 |
| DE | 102004038579 | 3/2006 |
| FR | 2 576 079 | 7/1986 |
| FR | 2 785 598 | 5/2000 |
| GB | 2 418 970 | 4/2006 |

* cited by examiner

VALVE FOR LIQUIDS

RELATED APPLICATION

This application is the national stage entry under 35 USC 371 of PCT/EP2012/001623, filed on Apr. 14, 2012 which, under 35 USC 119, claims the benefit of the priority date of German application DE 10 2011 018 479.1, filed on Apr. 21, 2013, the contents of which are herein incorporated by reference.

FIELD OF INVENTION

The invention relates to valves for liquid, and in particular, to ways to prevent valves from dripping.

BACKGROUND

A valve used for liquid often has a gas lock that prevents the valve from dripping when a closure element closes the valve.

In such a filling valve, the closure element is normally attached to a tappet that moves up and down. To open and close the valve, one normally moves the closure element up and down.

Within the filling valve is a valve chamber. The valve tappet and the closure element are both in this valve chamber. At its bottom end, the valve chamber has an opening for allowing filling product to leave it. In operation, the valve chamber is completely filled with filling product.

To close the filling valve, one moves the closure element from its open position to its closed position. This involves moving the valve tappet down. This means that more of the tappet's length will be inside the valve chamber. Naturally, this leaves less room for liquid in the chamber.

As noted above, the valve chamber is completely filled with filling product. This means that when the valve tappet moves down, it displaces liquid. This liquid has to go somewhere. Typically, this displaced liquid cause the gas lock to fail. As a result, the valve drips. In some cases, the displacement also causes a noticeable surge in pressure. This leads to even more dripping.

SUMMARY

The invention provides a valve for liquid, and in particular, a filling valve for beverages. The valve avoids or at least significantly reduces pressure surges and displacement of liquid in the valve chamber that occur as a result of moving mechanical parts inside the valve chamber.

In one aspect, the invention features a valve that avoids volume changes and pressure surges. This is achieved by no longer arranging the valve tappet directly in the valve chamber. As a result, the valve tappet is no longer in direct contact with the liquid.

Instead, the valve tappet is arranged within a hollow body that, in operation of, has a constant volume. The hollow body is arranged in the valve chamber. As a result, movement of the valve tappet is transferred to the actual valve cone in a way that avoids changes in the volume available to liquid within the valve chamber.

In another aspect, the invention features a valve having a linearly-moving closure element, for example a filling valve for liquid media, in which closing or opening is carried out without a change in the volume available for liquid in the valve chamber.

In some embodiments, the constant volume is formed from at least one flexible, elastically deformable element. In these embodiments, the elastic deformation does not result in any change in the volume taken up by the deformable element.

Another aspect of the invention features an apparatus for distributing a filling product. Such an apparatus includes a closure element, a liquid-dispensing filling valve configured for opening and closing an opening by linearly displacing the closure element, and an actuator, arranged within a constant volume. The actuator influences movement of the closure element. The valve includes a valve chamber in which the closure element and the constant volume are both arranged.

Some embodiments further include an elastically deformable element. In these embodiments, the constant volume is formed from the elastically deformable element. Among these are embodiments in which the elastically deformable element comprises a bellows.

Other embodiments include a rigid hollow body that forms the constant volume.

Yet other embodiments further include a fastening device that is mechanically connected to the actuator so that it transfers movements of the actuator. Among these embodiments are those in which the actuator and the fastening device are magnetically connected with each other.

In other embodiments, the constant volume comprises first and second bellows arranged in series. During operation of the valve, the liquid remain outside the first and second bellows.

In yet other embodiments, the valve chamber has an annular cross-section along at least a portion thereof.

Further embodiments include those in which the valve chamber comprises a first extent and a second extent, with the first extent having an annular cross-section and the second extent having a circular cross-section.

In yet other embodiments, the actuator moves relative to the constant volume.

In another aspect, the invention features a method for opening or closing a valve's opening to control flow of a liquid. In this method, the valve has a valve chamber that is filled with liquid. It also has a constant volume structure within the valve chamber. Opening and closing the valve includes moving an actuator that is disposed inside the constant volume structure relative to the constant volume structure. Moving this actuator linearly displaces a closure element.

In some practices of the invention, the valve is a filling valve for filling of beverages, whereas in others, it is a pipeline valve.

As used herein, the term "container" refers to cans, bottles, tubes, and pouches whether made of metal, glass, plastic, and any combination thereof, as well as to other packing means suitable for filling liquid or viscous products for pressurized filling or for filling at ambient pressure.

As used herein, expressions such as "substantially" or "approximately" mean deviations from the respective exact values by ±10%, preferably by ±5% and/or deviations in the form of changes irrelevant to the function.

BRIEF DESCRIPTION OF THE DRAWINGS

These and other features of the invention will be apparent from the following detailed description and the accompanying figures in which.

DETAILED DESCRIPTION

Figure 1:
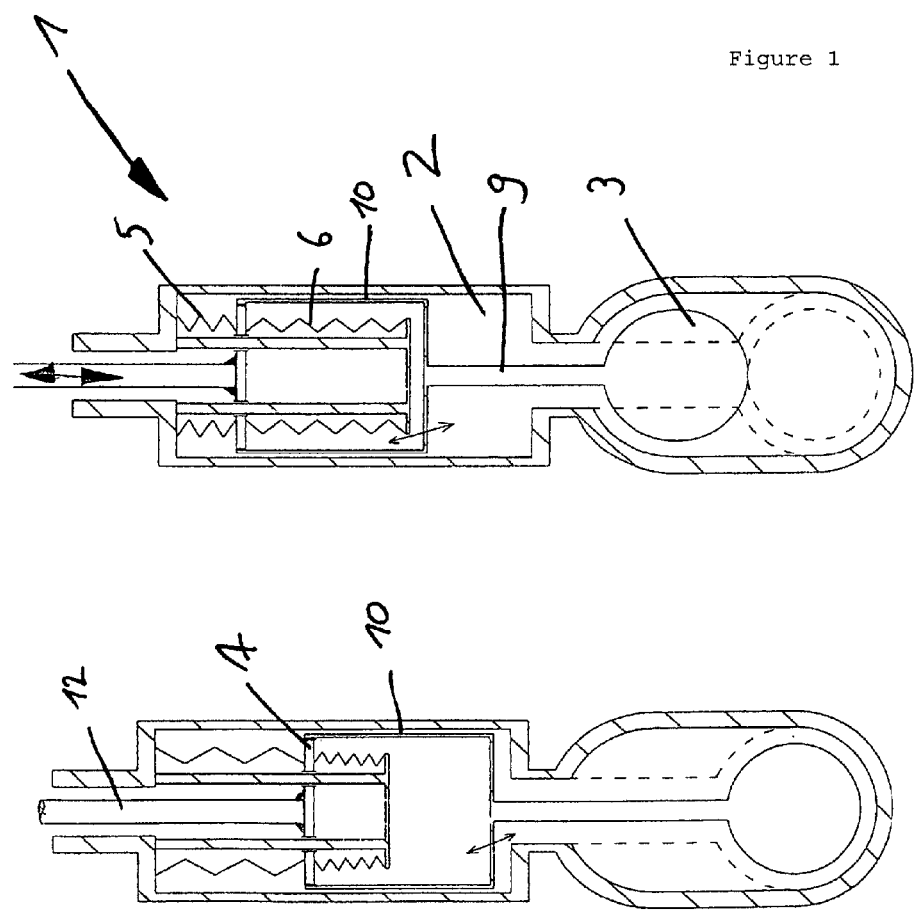
FIG. 1 shows a first embodiment of a valve for liquid according to the invention.

In an embodiment shown in FIG. 1, first and second bellows 5, 6 form a constant volume inside a valve chamber 2. The first bellows 5 has an upper end and a lower end. The upper end of the first bellows 5 attaches to the top of the valve chamber 2. The lower end of the first bellows 5 connects to a height-adjustable sealing disk 7. The second bellows 6 also has a top end and a bottom end. The top end of the second bellows 6 connects to a bottom of the sealing disk 7. The bottom end of the second bellows 6 connects to a top of a base disk 8. The base disk 8 forms a lower boundary of the constant volume.

The first and second bellows 5, 6 follow the movements of the sealing disk 7. As the height of the sealing disk 7 changes during operation of the valve, volumes of the first and second bellows 5, 6 change. However, the sum of these volumes remains constant.

An outer circumference of the height-adjustable sealing disk 7 connects to a fastening device 10. The fastening device 10 is shaped like a clamp or like a web. The valve tappet 9 connects the fastening device 10 to the actual closure element 3. In the illustrated embodiment, the closure element 3 is a valve cone.

An actuator 12 is arranged inside the constant volume formed by the first and second bellows 5, 7. This actuator 12 is connected to the sealing disk 7. Because of this connection, the sealing disk 7 follows the movements of the actuator 12. As a result, it is possible to cause the valve 1 to transition between an open and closed position without the side effect of changing the amount of volume available for liquid in the valve chamber 2. This avoids displacement that can lead to pumping.

The constant volume does not need to be made from bellows. In some embodiments, the constant volume is formed from elastically deformable elements. An example of an elastically deformable element is a rolling membrane or a structure that is similar to a rolling membrane.

Figure 2:
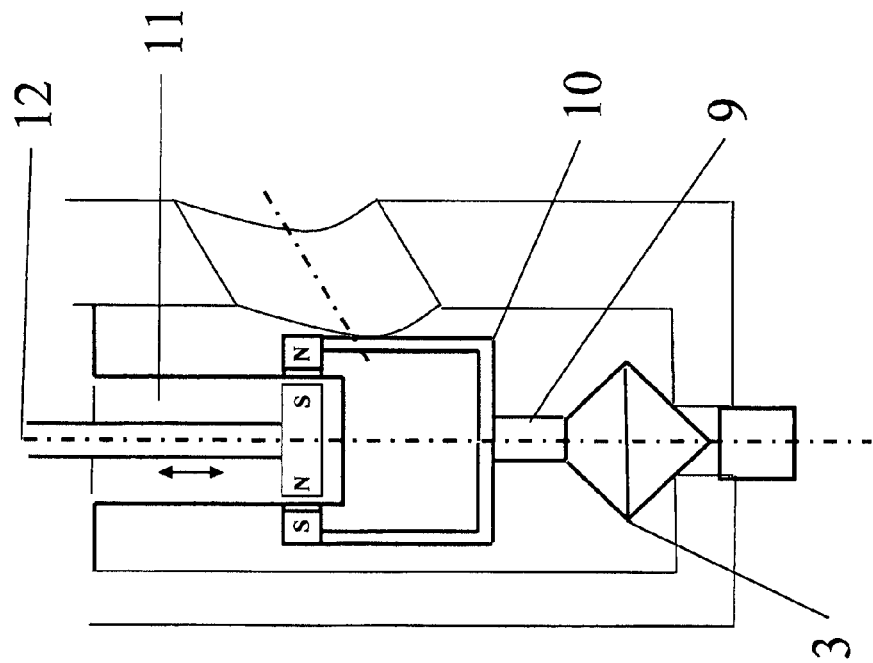
FIG. 2 shows a second embodiment of a valve for liquid according to the invention.

In another embodiment, which is shown in FIG. 2, a rigid hollow body 11 forms the constant volume.

Within the rigid hollow body 11 is an actuator 12 having first magnets arranged at a bottom thereof. Corresponding second magnets are arranged outside the hollow body 11. The second magnets are supported within a guide in such a way as to be movable with low friction.

The first and second magnets on opposite sides of the hollow body 11 form a trouble-free magnetic coupling that enables the outer magnets to follow the movements of the inner magnets without delay and without undue deviations in length of travel.

A fastening device 10 connects the outer magnets to a valve tappet 9. Preferably, the fastening device 10 is shaped like a web or clamp. The actual closure element 3 is connected to the fastening device 10. In the illustrated embodiment, the closure element 3 is a valve cone.

As was the case for the embodiment shown in FIG. 1, the embodiment shown in FIG. 2 permits opening and closing of the filling valve without changing the volume available for liquid within the valve chamber 2.

The fastening device 10 is designed such that, as it moves up and down, it presents the lowest possible flow resistance. Accordingly, the fastening device 10 preferably comprises rod-shaped elements aligned with the movement direction. Any elements arranged transverse to the direction of movement are designed to aid the flow, for example, by being streamlined.

The proposed magnetic coupling between the actuator 12 and the fastening device 10 has been shown for a case in which a rigid hollow body provides the constant volume. However, a similar magnetic coupling can also be carried out when, instead, an elastically deformable element forms the constant volume.

In addition to the valves described above for filling a container with liquid of all kinds, in which a distribution opening is opened or closed, the present invention is also suitable for application in valves that open or close a passage opening.

Figure 3:
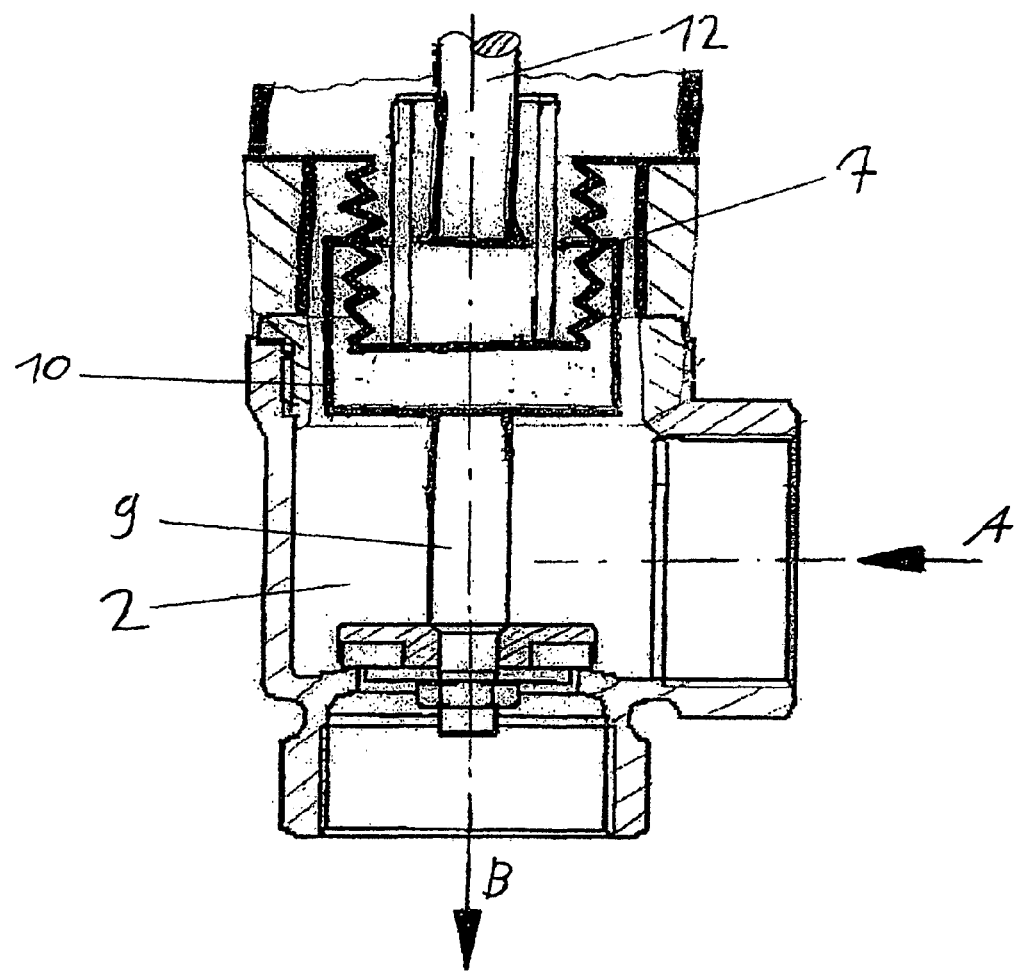
FIG. 3 shows a valve for liquid, modified according to the invention, for opening or closing a through-opening.

An example of such a valve is an angle valve, as shown in FIG. 3. In the illustrated valve, a liquid medium enters the valve by flowing in an entry direction A and exits the valve by flowing in an exit direction B.

In the embodiment shown in FIG. 3, a constant volume is also arranged within a valve chamber 2. This constant volume receives an actuator 12 and a sealing disk 7. A fastening device 10 connects the sealing disk 7 to the valve tappet 9. As a result, the fastening device 10 transfers the movement of the actuator 12 to the valve's closure element. The above arrangement avoids unwanted pressure surges generated by moving mechanical structures in contact with liquid, as is the case in a conventional valve.

A further example of a valve for liquid for opening or closing a through-opening is shown in FIG. 1 in the form of a so-called slide valve. By means of the illustrated design, according to the invention, of such a slide valve, such devices can be constructed to be hygienic, i.e. easy-to-clean.

To date, in such valves for liquid, due to the glands used for these and the linear movement of the closure element, each actuation introduces particulate matter into the valve chamber. This particulate matter originates from either dirt or from abrasion of the glands. Moreover, the portions of the actuator 12 located within the gland could not be cleaned.

Having described the invention, and a preferred embodiment thereof, what is claimed as new, and secured by Letters Patent is:

1. An apparatus for distributing a filling product, said apparatus comprising a filling valve for dispensing liquid, a closure element, and an actuator, wherein said filling valve is configured for opening and closing an opening thereof by linearly displacing said closure element, wherein said valve comprises a valve chamber in which said closure element is arranged, wherein said actuator influences movement of said closure element, and wherein said actuator is arranged within a constant volume, said constant volume being arranged within said valve chamber.

2. The apparatus of claim 1, further comprising an elastically deformable element, wherein said constant volume is formed from said elastically deformable element.

3. The apparatus of claim 2, wherein said elastically deformable element comprises a bellows.

4. The apparatus of claim 1, further comprising a rigid hollow body, wherein said constant volume is formed from said rigid hollow body.

5. The apparatus of claim 1, further comprising a fastening device mechanically connected with said actuator, wherein said fastening device is configured for transferring movements of said actuator.

6. The apparatus of claim 5, wherein said actuator and said fastening device are magnetically connected with each other.

7. The apparatus of claim 6, wherein said actuator comprises a first magnet, wherein said fastening device comprises a second magnet, and wherein said fastening device is configured such that movement of said first magnet causes movement of said fastening element.

8. The apparatus of claim 1, wherein said constant volume comprises first and second bellows arranged in series, and wherein, during operation of said valve, said liquid remains outside said first and second bellows.

9. The apparatus of claim 1, wherein said valve chamber has an annular cross-section along at least a portion thereof.

10. The apparatus of claim 1, wherein said valve chamber comprises a first extent and a second extent, wherein said first extent has an annular cross-section and wherein said second extent has a circular cross-section.

11. The apparatus of claim 1, wherein said actuator moves relative to said constant volume.

12. The apparatus of claim 1, wherein said valve chamber comprises a first portion and a second portion wherein said first portion consists of said constant volume, wherein said second portion is outside said constant volume, and wherein only said second portion contains said liquid.

13. The apparatus of claim 12, wherein said closure element is disposed in said second portion.

14. The apparatus of claim 13, wherein a total volume of liquid in said second portion is no greater than a total volume of said chamber less a volume of said constant volume less a volume of said closure element.

15. The apparatus of claim 1, wherein said valve chamber has a volume greater than a volume of said constant volume.

16. The apparatus of claim 1, wherein when said filling valve is closed, said valve chamber has a first volume available for said liquid, wherein when said filling valve is open, said valve chamber has a second volume available for said liquid, and wherein said first and second volumes are equal.

17. The apparatus of claim 1, wherein said actuator avoids contact with said liquid.

18. A method for opening or closing and opening an opening in a valve for dispensing liquid, said valve comprising a valve chamber that is filled with said liquid and a constant volume structure within said valve chamber, wherein opening or closing of said valve comprises moving an actuator that is disposed inside said constant volume structure relative to said constant volume structure, and wherein moving said actuator results in linearly displacing a closure element.

19. The method of claim 18, wherein said valve is a filling valve for filling of beverages.

20. The method of claim 18, wherein said valve is a pipeline valve.

* * * * *